(12) United States Patent  
Uscumlic et al.

(10) Patent No.: US 11,979,769 B2  
(45) Date of Patent: May 7, 2024

(54) VIRTUALIZATION OF TRANSCEIVERS FOR MULTI-TENANT PROGRAMMABLE NETWORK-BASED DEVICES

(71) Applicant: Nokia Solutions and Networks Oy, Espoo (FI)

(72) Inventors: Bogdan Uscumlic, Les Ulis (FR); Andrea Enrici, Bourg la Reine (FR)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 154 days.

(21) Appl. No.: 17/238,457

(22) Filed: Apr. 23, 2021

(65) Prior Publication Data  
US 2022/0345930 A1  Oct. 27, 2022

(51) Int. Cl.  
*H04W 28/02* (2009.01)  
*H04L 5/00* (2006.01)  
*H04W 28/08* (2023.01)  
*H04W 28/086* (2023.01)

(52) U.S. Cl.  
CPC ....... *H04W 28/0263* (2013.01); *H04L 5/0005* (2013.01); *H04L 5/0098* (2013.01); *H04W 28/0831* (2020.05); *H04W 28/0861* (2023.05)

(58) Field of Classification Search  
CPC ... H04L 5/0005; H04L 5/0091; H04L 5/0098; H04W 28/0263; H04W 28/0808; H04W 28/0831  
See application file for complete search history.

(56) References Cited

U.S. PATENT DOCUMENTS 10,707,875 B1 * 7/2020 Orthner ............ H03K 19/17756

OTHER PUBLICATIONS

A. M. Caulfield et al., "A cloud-scale acceleration architecture," 2016 49th Annual IEEE/ACM International Symposium on Microarchitecture (MICRO), Taipei, 2016, pp. 1-13.  
P4 Language Consortium viewed on Feb. 25, 2021, [retrieved from internet <https://p4.org/> ].

* cited by examiner

*Primary Examiner* — Khoa Huynh  
(74) *Attorney, Agent, or Firm* — Harness, Dickey & Pierce, P.L.C.

(57) ABSTRACT

A programmable device includes a plurality of first partial reconfiguration slots, a plurality of transceivers and a second partial reconfiguration slot. The plurality of first partial reconfiguration slots are configured to execute one or more applications or network functions. The second partial reconfiguration slot is configured to route data traffic flows between the plurality of first partial reconfiguration slots and the plurality of transceivers.

16 Claims, 10 Drawing Sheets

VIRTUALIZATION OF TRANSCEIVERS FOR MULTI-TENANT PROGRAMMABLE NETWORK-BASED DEVICES

BACKGROUND

A field-programmable gate array (FPGA) is an integrated circuit designed to be configured or re-configured after manufacture. FPGAs contain an array of Configurable Logic Blocks (CLBs), and a hierarchy of reconfigurable interconnects that allow these blocks to be wired together, like many logic gates that can be inter-wired in different configurations. CLBs may be configured to perform complex combinational functions, or simple logic gates like AND and XOR. CLBs also include memory blocks, which may be simple flip-flops or more complete blocks of memory, and specialized Digital Signal Processing blocks (DSPs) configured to execute some common operations (e.g., filters).

SUMMARY

The scope of protection sought for various example embodiments of the disclosure is set out by the independent claims. The example embodiments and/or features, if any, described in this specification that do not fall under the scope of the independent claims are to be interpreted as examples useful for understanding various embodiments.

At least one example embodiment provides a programmable device (e.g., a field-programmable gate array (FPGA)) comprising: a plurality of first partial reconfiguration slots configured to execute one or more applications or network functions; a plurality of transceivers; and a second partial reconfiguration slot configured to route data traffic flows between the plurality of first partial reconfiguration slots and the plurality of transceivers.

According to one or more example embodiments, the second partial reconfiguration slot may be configured to: compute a routing configuration for routing the data traffic flows between the plurality of first partial reconfiguration slots and the plurality of transceivers based on a request from a network controller, and route the data traffic flows based on the routing configuration.

The second partial reconfiguration slot may be configured to: determine that at least a portion of a first partial reconfiguration slot, among the plurality of first partial reconfiguration slots, is to become active or inactive; determine that a change to a current routing configuration is required in response to determining that at least the portion of the first partial reconfiguration slot is to become active or inactive; and compute the routing configuration in response to determining that a change to the current routing configuration is required.

The request may include load-balancing parameters for the routing configuration. The second partial reconfiguration slot may be configured to: determine that load-balancing of the data traffic flows is required at the programmable device based on the request, and apply the load-balancing, according to the load-balancing parameters, to route the data traffic flows between the plurality of first partial reconfiguration slots and the plurality of transceivers.

The load-balancing parameters may include: at least one of an identification of transceivers, from among the plurality of transceivers, to be utilized for load-balancing of the data traffic flows at the programmable device, or a ratio of the data traffic flows to be transmitted between sets of transceiver and partial reconfiguration slot pairs.

Each of the plurality of partial reconfiguration slots may include a programming block configured to execute an application or network function. The second partial reconfiguration slot is configured to: sort the plurality of transceivers in order based on bandwidth capacities for each of the plurality of transceivers; sort the plurality of programming blocks based on bandwidth requirements for the plurality of programming blocks; and computing the load-balancing parameters based on the sorted plurality of transceivers and the sorted plurality of programming blocks.

The second partial reconfiguration slot may include: full interconnection with each of the plurality of first partial reconfiguration slots, and dedicated direct interconnections with each of the plurality of transceivers.

The second partial reconfiguration slot may include: interconnection circuitry interconnected with each of the plurality of first partial reconfiguration slots; dedicated direct interconnection circuitry interconnected with each of the plurality of transceivers; and a transceiver rerouting and adaptation logic configured to route the data traffic flows between the interconnection circuitry and the dedicated direct interconnection circuitry.

The second partial reconfiguration slot may include transceiver sharing circuitry configured to apply load-balancing to route the data traffic flows.

The programmable device may be a field-programmable gate array (FPGA).

At least one other example embodiment provides a programmable device (e.g., a field-programmable gate array (FPGA)) comprising: means for executing one or more applications or network functions; means for transmitting and receiving data traffic to and from the programmable device; and means for routing data traffic flows between the means for executing and the means for transmitting and receiving.

At least one other example embodiment provides a method of routing traffic at a programmable device including a plurality of first partial reconfiguration slots, a plurality of transceivers and a second partial reconfiguration slot, the method comprising: configuring a dedicated partial reconfiguration slot to route data traffic flows between a plurality of first partial reconfiguration slots and a plurality of transceivers at the programmable device, the plurality of first partial reconfiguration slots configured to execute one or more applications or network functions; and routing the data traffic flows between the plurality of partial reconfiguration slots and the plurality of transceivers.

At least one other example embodiment provides a non-transitory computer-readable storage medium storing computer-readable instructions that, when executed at a programmable device, cause the programmable device to perform a method of routing traffic at the programmable device, the programmable device including a plurality of first partial reconfiguration slots, a plurality of transceivers and a second partial reconfiguration slot, and the method comprising: configuring a dedicated partial reconfiguration slot to route data traffic flows between a plurality of first partial reconfiguration slots and a plurality of transceivers at the programmable device, the plurality of first partial reconfiguration slots configured to execute one or more applications or network functions; and routing the data traffic flows between the plurality of partial reconfiguration slots and the plurality of transceivers.

According to example embodiments, the method may further include: computing a routing configuration for routing the data traffic flows between the plurality of first partial reconfiguration slots and the plurality of transceivers based on a request from a network controller; and configuring the dedicated partial reconfiguration slot based on the routing configuration.

The method may further include: determining that at least a portion of a first partial reconfiguration slot, among the plurality of first partial reconfiguration slots, is to become active or inactive; determining that a change to a current routing configuration is required in response to determining that at least the portion of the first partial reconfiguration slot is to become active or inactive; and computing the routing configuration in response to determining that a change to the current routing configuration is required.

The request may include load-balancing parameters for the routing configuration, and the method may further include: determining that load-balancing of the data traffic flows is required at the programmable device based on the request, and applying the load-balancing, according to the load-balancing parameters, to route the data traffic flows between the plurality of first partial reconfiguration slots and the plurality of transceivers.

The load-balancing parameters may include: an identification of transceivers, from among the plurality of transceivers, to be utilized for load-balancing of the data traffic flows at the programmable device, and a ratio of the data traffic flows to be transmitted between sets of transceiver and partial reconfiguration slot pairs.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

Figure 1:
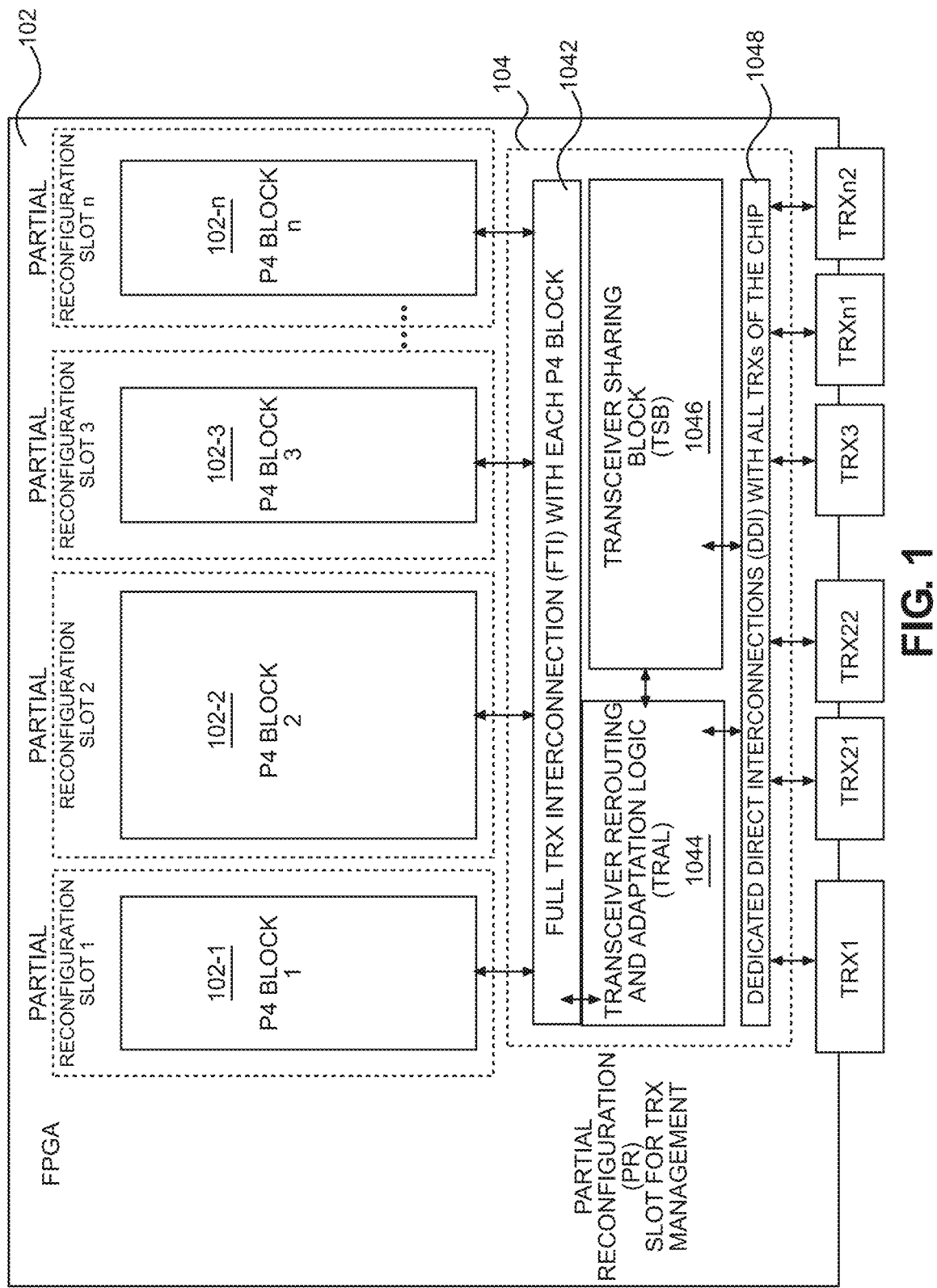
FIG. 1 is a block diagram illustrating a field programmable gate array (FPGA) according to example embodiments.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

In modern cloud-based data centers, servers are equipped with reconfigurable hardware (e.g., field-programmable gate arrays (FPGAs)), which is used to accelerate the computation of data-intensive or time-sensitive applications. In webscale architectures FPGAs may be used to accelerate the network (e.g., ensure fast packet forwarding) and/or accelerate the data (e.g., CPU workload) processing.

FPGA reconfigurability is referred to as "partial reconfiguration," which supposes that parts of FPGA hardware may be reconfigured while the FPGA is running (in operation). The partial reconfiguration is performed on allocated portions of a FPGA chip (or FPGA reconfigurable logic), which are known as "partial reconfiguration slots." In particular, partial reconfiguration (PR) allows for multiple tenants in a data center to use/share a single FPGA. In one example, partial reconfiguration slots may be programmed/reprogrammed using Programming Protocol-independent Packet Processors (P4) to perform network functions or services (e.g., routing, switching, application processing, etc.).

P4 is a novel data-plane programming language enabling data-plane programming during the exploitation lifetime of a device. P4 provides a novel paradigm, which differs from the approach used by traditional Application Specific Integrated Circuit (ASIC)-based devices (e.g., switches). Furthermore, P4 is target-independent in that the programming language may be applied to central processing units (CPUs), FPGAs, system-on-chips (SoCs), etc., and is protocol-independent in that the programming language supports all data-plane protocols and may be used to develop new protocols.

When implemented on FPGAs, P4 applications allow for reprogramming of only some portions of a FPGA (some or all of the partial reconfiguration slots), without stopping (or interrupting) operation of the device.

FPGAs with P4 modules in their partial reconfiguration slots are then interconnected in a webscale cloud.

P4 applications are composed of P4 modules that use different reconfigurable portions of FPGA's resources.

Although discussed herein with regard to P4 modules and workloads, example embodiments should not be limited to this example. Rather, example embodiments may be applicable to any kind of workload.

As a result of FPGA reconfigurability, each FPGA accelerator in a webscale cloud may be configured to contain n partial reconfiguration slots. As mentioned above, these partial reconfiguration slots may be dynamically reconfigured during operation of the FPGA.

Conventionally, partial reconfiguration slots contain or utilize some FPGA resources allocated in a fixed way (e.g., transceivers (TRXs), Block Random Access Memories (BRAMs), look-up tables (LUTs), flip-flops (FFs), etc.) and a packet forwarding/processing function, which may be programmed by P4 language (referred to as a "P4 block"). Among these FPGA resources, the transceivers may be the most expensive resources since their number on a FPGA chip is limited. As discussed herein, a transceiver may be defined as a FPGA logic unit that allows (e.g., high-speed) transmission and reception of data traffic (or data traffic flows). For example, a FPGA logic unit at data-rate of 10 Gbit/s may be used to implement a 10 Gbit/s Ethernet interface or some other protocol operating at a similar data rate.

This conventional pre-reservation (fixed allocation) of components may impose limitations on resource sharing at the FPGA because once allocated to a single P4 block, the transceiver cannot be used by another P4 block unless the two blocks are reconfigured. Since network conditions (and transit traffic on transceivers) may vary in a webscale cloud, and also since some partial reconfiguration slots may become temporally inactive, thereby blocking the use of their transceivers, fixed allocation may be even more pronounced and/or penalizing on FPGA performance.

One or more example embodiments provide a dedicated partial reconfiguration slot for transceiver virtualization within an FPGA. The dedicated partial reconfiguration slot includes architecture elements executing methods to support the transceiver virtualization functionality. According to at least some example embodiments, the dedicated partial reconfiguration slot may include a transceiver rerouting and adaptation logic (TRAL), a transceiver sharing block (TSB) (also referred to as transceiver sharing circuitry), full transceiver interconnections (FTI) with all P4 blocks (also referred to as TRX or transceiver interconnection circuitry), and dedicated direct interconnections (DDI) with all transceivers of the FPGA chip (also referred to as dedicated direct interconnection circuitry). Each of these elements will be discussed in more detail below.

As discussed herein, "dynamic routing" refers to instances in which load-balancing of traffic is used, whereas "fixed routing" refers to instances in which load-balancing is not used.

Figure 2:
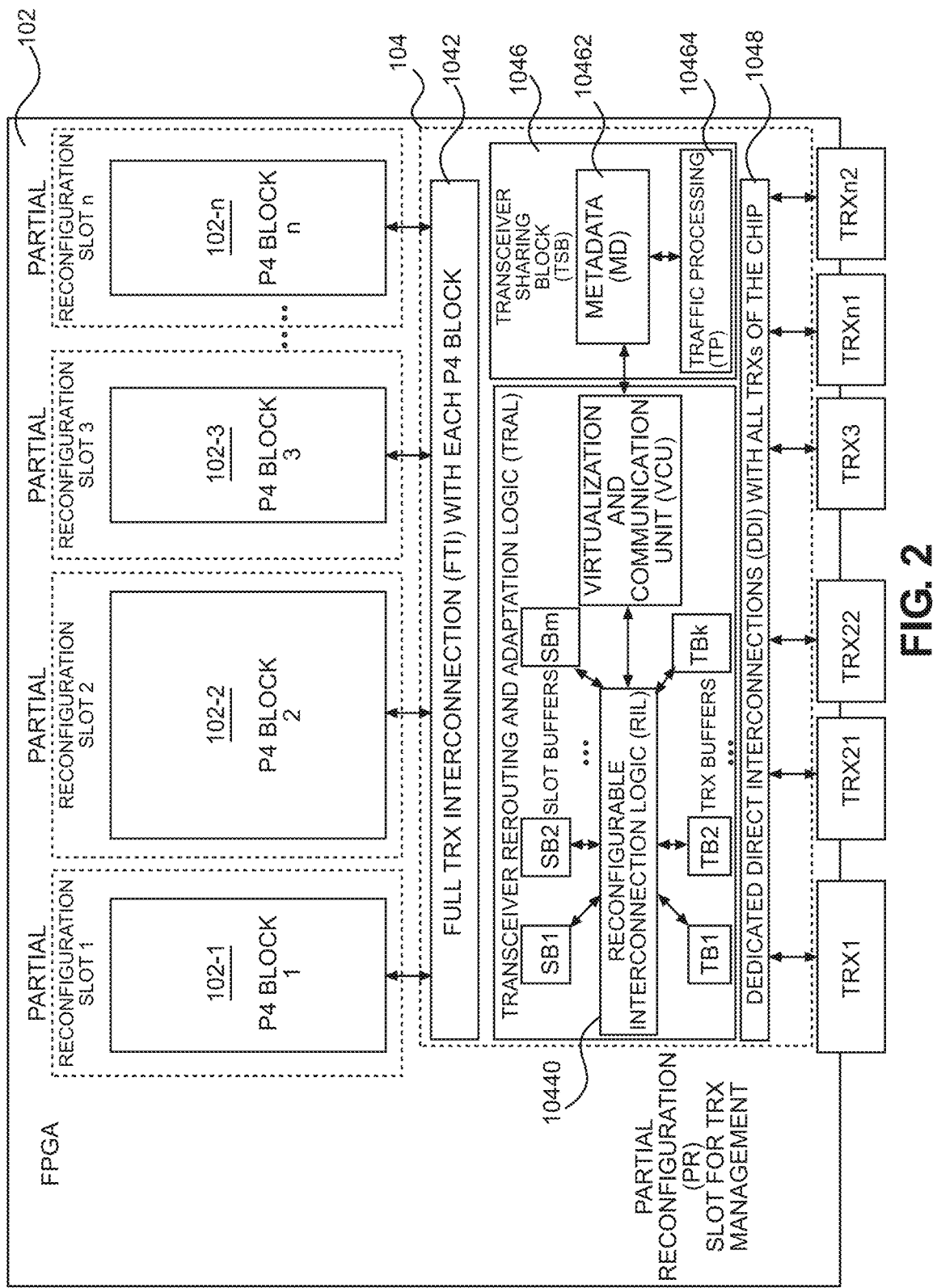
FIG. 2 is a block diagram of a FPGA illustrating the transceiver rerouting and adaptation logic (TRAL) and the transceiver sharing block (TSB), according to example embodiments, in more detail.

FIG. 1 is a block diagram illustrating a FPGA according to example embodiments. FIG. 2 is a block diagram of the FPGA of FIG. 1, but with the TRAL and the TSB illustrated in more detail. As mentioned above, example embodiments will be described herein with regard to P4 blocks for example purposes. However, example embodiments should not be limited to this example.

Referring to FIGS. 1 and 2, the FPGA 102 includes a plurality of first partial reconfiguration slots 1, 2, 3, . . . , n, each of which includes a respective P4 block (also referred to more generally as a programming block) 102-1, 102-2, 102-3, . . . , 102-n. The FPGA 102 further includes a second partial reconfiguration slot 104 (also referred to as a dedicated second partial reconfiguration slot) and a plurality of transceivers TRX1, TRX21, TRX22, TRX3, . . . , TRXn1, TRXn2. The second partial reconfiguration slot 104 is a dedicated partial reconfiguration slot for transceiver virtualization at the FPGA 102.

The second partial reconfiguration slot 104 includes a TRAL 1044 that is bidirectionally interconnected with a FTI 1042, a TSB 1046 and a DDI 1048. The TSB 1046 is also bidirectionally interconnected with the DDI 1048.

The FTI 1042 is connected to each (all) of the partial reconfiguration slots 1, 2, 3, . . . , n (or P4 blocks 102-1, 102-2, 102-3, . . . 102-n). The DDI 1048 is connected to each (all) of the transceivers TRX1, TRX21, TRX22, TRX3, . . . , TRXn1, TRXn2.

The FTI 1042 interconnects the AXI stream interface of P4 blocks 102-1, 102-2, 102-3, . . . 102-n with the AXI stream interfaces of corresponding slot buffers SB1, SB2, . . . , SBm (discussed below with regard to the TRAL 1044). Functionally, the FTI 1042 is configured to effect traffic flow switching by adapting the new AXI stream interface of P4 blocks 102-1, 102-2, 102-3, . . . 102-n to the fixed AXI stream interfaces of the slot buffers SB1, SB2, . . . , SBm.

In more detail, the FTI 1042 includes interconnection logic to/from each partial reconfiguration slot 1, 2, 3, . . . , n (or P4 block 102-1, 102-2, 102-3, . . . 102-n) on the FPGA 102.

The DDI 1048 interconnects the AXI stream interfaces of transceiver buffers TB1, TB2, . . . TBk (discussed below with regard to the TRAL 1044) to a corresponding set of the AXI stream interfaces for the transceivers TRX1, TRX21, TRX22, TRX3, . . . , TRXn1, TRXn2. Functionally, the DDI 1048 is configured to effect switching by interconnecting the AXI stream interfaces of the transceiver buffers TB1, TB2, . . . TBk to a new or updated (different) set of AXI stream interfaces of the transceivers TRX1, TRX21, TRX22, TRX3, . . . , TRXn1, TRXn2.

Similar to the FTI 1042, the DDI 1048 contains all interconnection logic to/from each of the transceivers TRX1, TRX21, TRX22, TRX3, . . . , TRXn1, TRXn2 on the FPGA 102.

Although example embodiments will be discussed herein with regard to the AXI stream interface as an example of a bus interface, example embodiments should not be limited to this example. Rather, other bus interface technologies may be used.

The TRAL 1044 interconnects the FTI 1042 and the DDI 1048 to enable traffic flows from corresponding P4 blocks and transceivers to be "routed" (interconnected) according to, for example, a particular use-case that is implemented. As discussed in more detail later, with the assistance of the TSB 1046, the TRAL 1044 may apply load-balancing for one or more (e.g., a set) of the P4 blocks 102-1, 102-2, 102-3, . . . 102-n and/or transceivers TRX1, TRX21, TRX22, TRX3, . . . , TRXn1, TRXn2. In at least some example embodiments, the TSB 1046 may apply (or, alternatively, determine load-balancing parameters and apply) load-balancing for routing the traffic flows between (to and from) the P4 blocks 102-1, 102-2, 102-3, . . . 102-n and the transceivers TRX1, TRX21, TRX22, TRX3, . . . , TRXn1, TRXn2.

According to one or more example embodiments, load-balancing may include: 1) queueing of the traffic that the TSB 1046 receives from input queues (e.g., slot buffers SB1, SB2, . . . , SBm) of the TRAL 1044; and 2) statistical or deterministic traffic dequeing (and sending back to transceiver queues at the TRAL 1044) of this traffic according to the weights (or ratios) for load-balancing (e.g., included in the load-balancing parameters discussed later).

Still referring to FIGS. 1 and 2, the TRAL 1044 includes m slot buffers SB1 SB2, . . . , SBm to buffer data traffic to/from each P4 block and k transceiver buffers TB1, TB2, . . . TBk to buffer data traffic to/from each transceiver. In some examples, the number of slot buffers may be the same as the number of partial reconfiguration slots (m=n). However, example embodiments are not limited to this example. Similarly, in some examples, the number of transceiver buffers may be the same as the number of transceivers (k=n). However, example embodiments should not be limited to this example.

The TRAL 1044 further includes reconfigurable interconnection logic (RIL) 10440 and virtualization and communication unit (VCU) (also referred to as virtualization and communication circuitry) 10442.

The RIL 10440 interconnects the slot buffers SB1, SB2, . . . , SBm with the transceiver buffers TB1, TB2, . . . , TBm. The RIL 10440 is a reconfigurable interconnection logic within the FPGA 102, and more specifically, within the second partial reconfiguration slot 104, which may be reconfigured as needed during operation of the FPGA 102.

The VCU 10442 may be a function block. The VCU 10442 is configured to calculate the transceiver virtualization configurations and communicate with other blocks internal (e.g., the TSB 1046 within the FPGA 102) and external to the FPGA 102 (e.g., with a network controller (not shown)).

The TSB 1046 includes metadata (MD) 10462 and traffic processing block (TP) (also referred to as traffic processing or traffic processing circuitry) 10464. The MD 10462 is configured to exchange information with the TRAL 1044, and the TP 10464 is configured to perform load-balancing tasks. According to one or more example embodiments, the TSB 1046 may be implemented in P4 language (as a P4 block). Because MD blocks are generally known, a detailed discussion is omitted.

Although not shown, each of the TRAL 1044 and the TSB 1046 may include (or be implemented as) a state machine to enable storage of a current state (e.g., configuration, load-balancing, etc.) of the respective element. Because state machines are generally well known, a detailed discussion is omitted.

Example functionality of the TRAL 1044 and the TSB 1046 will be discussed in more detail below with regard to FIGS. 7 and 8.

Figure 7:
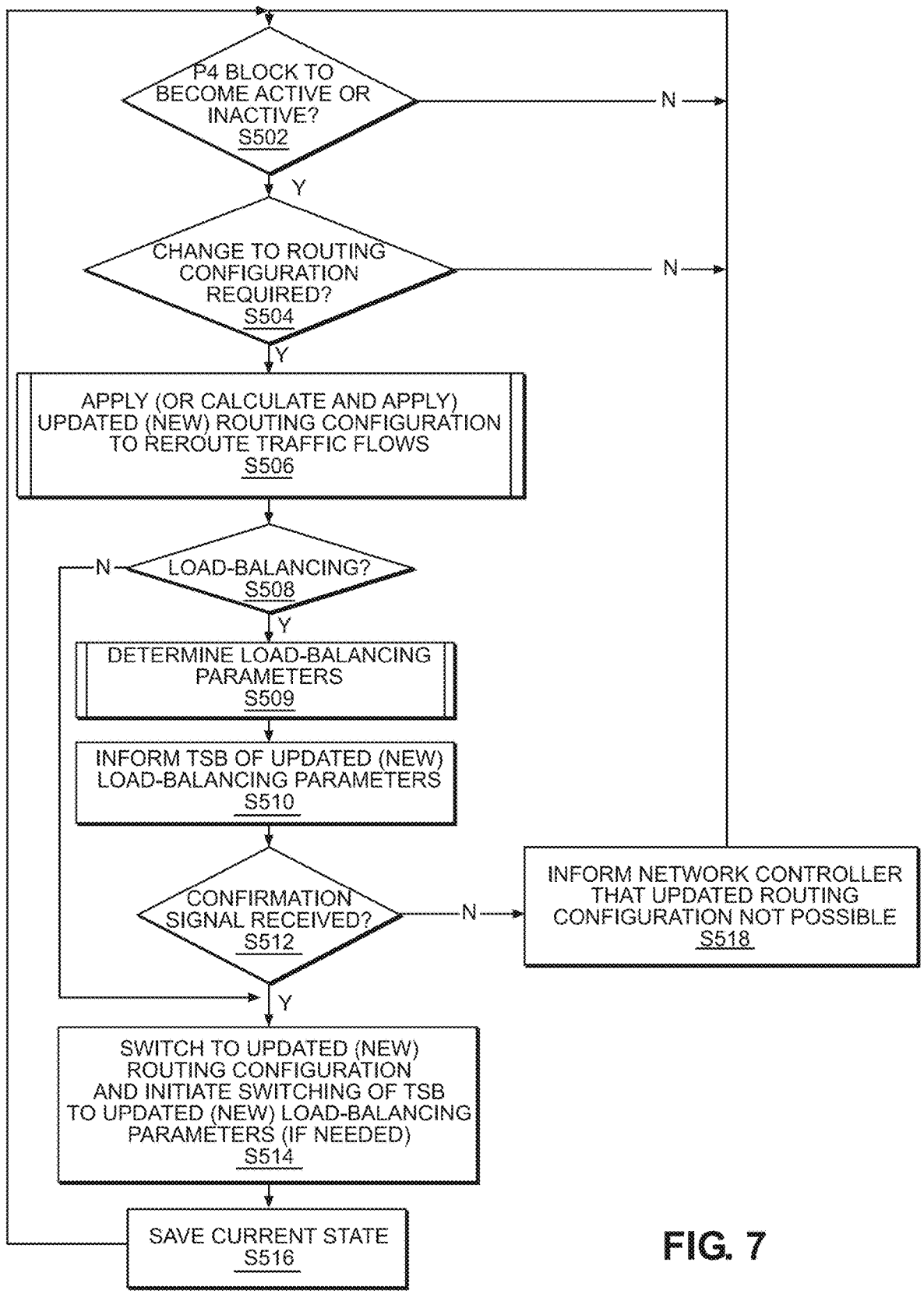
FIG. 7 is a flow chart illustrating a method according to example embodiments.

FIG. 7 is a flow chart illustrating a method according to example embodiments. The method shown in FIG. 7 will be discussed with regard to being performed by the TRAL 1044, or more specifically, the VCU 10442. However, example embodiments should not be limited to this example.

Referring to FIG. 7, the VCU 10442 at the TRAL 1044 determines whether a P4 block at the FPGA 102 is to be activated or deactivated (become active or inactive) based on information from the network controller (not shown). In at least one example embodiment, the VCU 10442 may periodically check whether a P4 block is to become active or inactive. In another example, the VCU 10442 may determine whether a P4 block is to become active or inactive in response to receiving a request indicating the same from the network controller. The request from the network controller may be based on a user request to add or terminate a network function.

If activation or deactivation of a P4 block is not requested and/or needed, then the VCU 10442 continues to periodically check to identify when a P4 block is to become active or inactive or continues to await a request indicating the same from the network controller.

If the VCU 10442 determines that a P4 block is to be activated or deactivated at step S502, then at step S504 the VCU 10442 determines whether changes to the routing configuration (also referred to as P4 block connectivity or interconnections for routing traffic flows) at the RIL 10440 are required based on the activation or deactivation of the P4 block. In at least one example embodiment, the request from the network controller may indicate that changes to the routing configuration are required at the FPGA 102.

If changes to the routing configuration are not required, then the process returns to step S502, and continues as discussed herein.

Returning to step S504, if changes to the routing configuration are required, then at step S506 the VCU 10442 applies (or calculates and applies) updated (new) routing configuration (routing of traffic flows) between transceivers and P4 blocks at the FPGA 102. In one example, the updated routing of traffic flows may be provided to the VCU 10442 by the network controller in the request. In another example, the VCU 10442 may compute the updated routing configuration based on bandwidth requirements of the P4 blocks and bandwidth capacities for the transceivers. The updated routing configuration may include a mapping between P4 blocks and corresponding transceivers such that traffic to/from a P4 block is routed through one or more corresponding transceivers.

According to one or more example embodiments, transceivers may be mapped or allocated such that transceivers are at least temporarily shared among the P4 blocks. For example, a transceiver associated with an inactive P4 block may be at least temporarily utilized (e.g., mapped and/or allocated) to a currently active P4 block such that the transceivers are utilized more efficiently at the FPGA 102. Such sharing may be part of the routing configuration applied (or computed and applied) at step S506). In one example, the sharing configuration may be provided by the network controller in the request.

Figure 9:
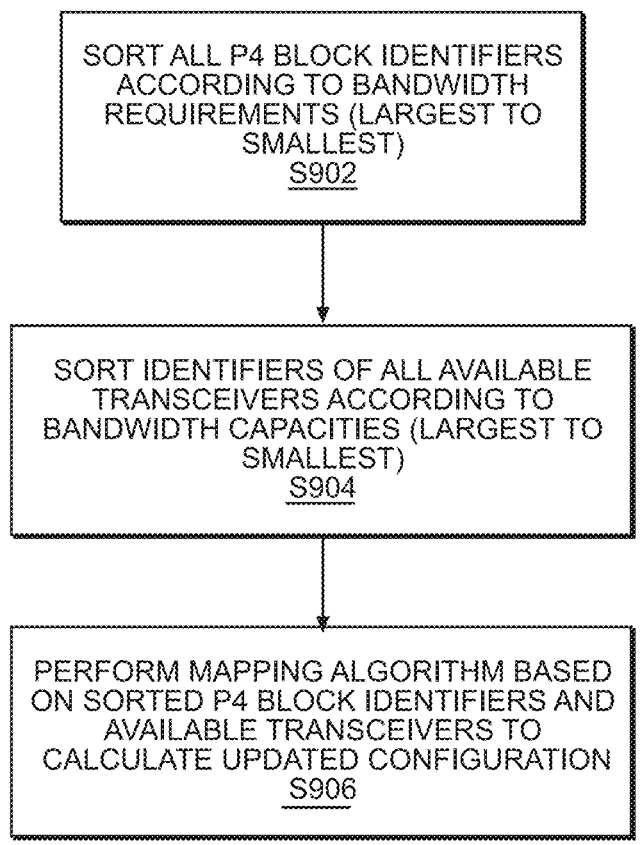
FIG. 9 is a flow chart illustrating yet another method according to example embodiments.

FIG. 9 is a flow chart illustrating a method for computing an updated routing configuration according to example embodiments. The method shown in FIG. 9 will be discussed with regard to being performed by the VCU 10442. However, example embodiments should not be limited to this example.

Referring to FIG. 9, at step S902 the VCU 10442 sorts all P4 blocks (e.g., by corresponding P4 block identifiers) based on their associated bandwidth requirements. In this example, the VCU 10442 sorts the P4 block identifiers in decreasing order according to the value of their bandwidth requirements (largest bandwidth requirement first and smallest bandwidth requirement last). The P4 block identifiers and bandwidth requirements are known at the FPGA 102. The bandwidth requirements for a particular P4 block are based on intended or current functionality of the P4 block.

At step S904, VCU 10442 sorts all available transceivers (e.g., by corresponding identifiers) based on their bandwidth requirements. In this example, the VCU 10442 sorts the available transceivers in decreasing order according to values of their bandwidth capacities (largest capacity first and smallest capacity last. The bandwidth capacities of the transceivers are known at the FPGA 102 based on, for example, the hardware capabilities of the FPGA 102.

In one example, an available transceiver may be a transceiver not mapped to one or more P4 blocks and/or a transceiver having additional bandwidth capacity after having been mapped to one or more P4 blocks.

At step S906, VCU 10442 performs a mapping algorithm based on the sorted P4 block identifiers and the sorted available transceivers to compute the updated routing configuration. In one example, for each P4 block in the order established at step S902, the VCU 10442 takes each transceiver in turn and maps (routes) the P4 block to the given transceiver if the P4 block bandwidth requirement fits (e.g., is less than or equal to) the transceiver capacity. The VCU 10442 then stores the mapping in a memory (not shown), such as in a look-up or routing table.

Example pseudocode for implementing step S906 at the VCU 10442 is shown below. In this example, TRX represents a transceiver.

```
FOR all P4 block ids taken in the order established in S902 DO
    FOR all TRX ids taken in the order established in S904 DO
        IF taken P4 block bandwidth requirement fits the TRX capacity
        THEN
            Memorize the routing choice (map P4 block to TRX)
            BREAK
        END IF
    END FOR
END FOR
```

Through the method of FIG. 9, each P4 block is mapped to at least one transceiver. In at least some example embodiments, some transceivers may remain available after the determining the updated routing configuration. As mentioned above, in one example, available transceivers may include transceivers not mapped to one or more P4 blocks and/or transceivers having additional bandwidth capacity after having been mapped to one or more P4 blocks).

Returning to FIG. 7, at step S508, the VCU 10442 determines whether load-balancing is needed for the updated routing configuration determined at step S506. In other words, the VCU 10442 determines whether dynamic routing should be used in connection with the updated routing configuration. The indication of whether dynamic routing should be used may be provided in the request from the network controller.

If the VCU 10442 determines that load-balancing is needed for the updated routing configuration, then at step S509 the VCU 10442 determines (or calculates and applies) updated load-balancing parameters for load-balancing at the TSB 1046. According to at least some example embodiments, the load-balancing parameters may include an identification of (available) transceivers to be utilized for load-balancing, and statistical ratios of traffic flows to be sent to a particular transceiver from a particular P4 block (or, alternatively, an amount of traffic to be sent to a particular transceiver).

In one example, the updated load-balancing parameters may be provided by the network controller (e.g., in the request discussed above with regard to step S502 or in a separate load-balancing message from the network controller). In another example, the VCU 10442 may compute the updated load-balancing parameters based on at least bandwidth capacities of available transceivers (e.g., transceivers not mapped to one or more P4 blocks and/or transceivers having additional bandwidth capacity after having been mapped to one or more P4 blocks).

Figure 10:
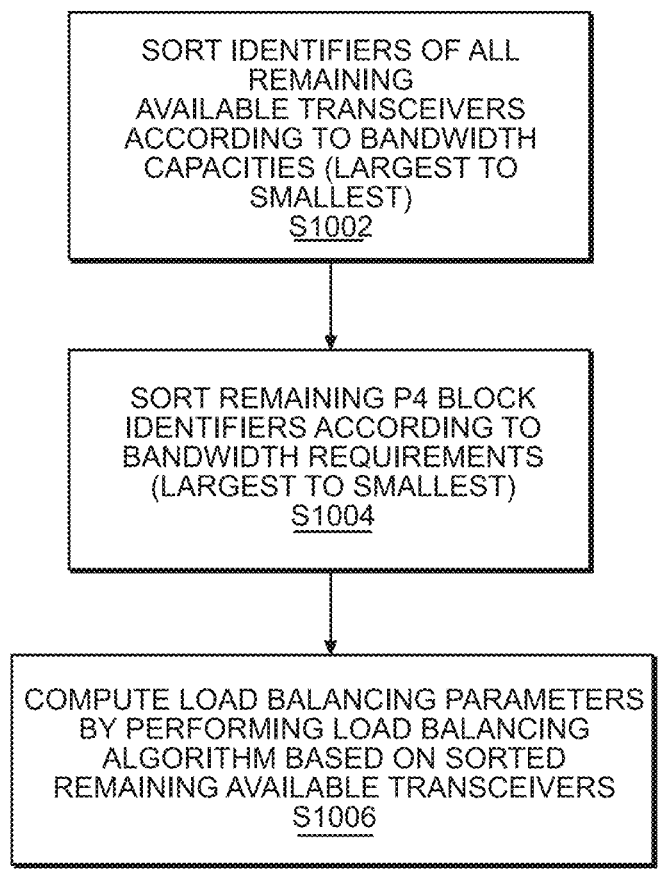
FIG. 10 is a flow chart illustrating yet another method according to example embodiments.

FIG. 10 is a flow chart illustrating a method for computing load-balancing parameters according to example embodiments. The method shown in FIG. 10 will be discussed with regard to being performed by the VCU 10442. However, example embodiments should not be limited to this example.

Referring to FIG. 10, at step S1002 the VCU 10442 sorts all remaining available transceivers (e.g., after determining and/or application of the updated routing configuration) based on their bandwidth capacities. In this example, the VCU 10442 sorts the remaining available transceivers in decreasing order according to values of their available bandwidth capacities (largest capacity first and smallest capacity last).

At step S1004, the VCU 10442 sorts all P4 blocks currently without load-balancing (non-load-balanced P4 blocks) based on their associated bandwidth requirements. In this example, the VCU 10442 sorts the P4 block identifiers in decreasing order according to the values of their bandwidth requirements (largest bandwidth requirement first and smallest bandwidth requirement last).

At step S1006, the VCU 10442 computes the load-balancing parameters by performing a load-balancing algorithm based on the sorted, remaining available transceivers. In one example, the VCU 10442 allocates the remaining available transceivers to the non-load-balanced P4 blocks in order from largest to smallest. Once a transceiver is assigned to a P4 block, the VCU 10442 determines proportional sharing weights for the transceivers assigned to the P4 block (e.g., according to a ratio of the capacity of the transceiver) participating in load-balancing of the given P4 block. Each time a transceiver is allocated to a P4 block and proportional sharing weights are determined, the list of P4 blocks is updated to remove the now load-balanced P4 block from the list.

Example pseudocode for implementing steps S1004 and S1006 at the VCU 10442 is shown below. In this example, TRX represents a transceiver.

```
FOR all TRX taken in the order established in S1002 above DO
    Sort all P4 blocks (that still do not have load-balancing TRX)
    according to the decreasing value of their bandwidth requirements
    Allocate the current TRX (for load-balancing) to the first in line P4
    block according to the sorting above
    Apply proportional sharing weights for TRXs (in ratio of TRXs'
    capacities) participating in the load-balancing of the chosen P4 block
    Update the list of P4 blocks that still do not have load-balancing
    TRX
END FOR
```

Returning again to FIG. 7, at step S510, the VCU 10442 informs the TSB 1046 (e.g., via the MD 10462) of the updated load-balancing parameters. In one example, the VCU 10442 outputs a load-balancing parameter update message to the TSB 1046.

Once having informed the TSB 1046 of the updated load-balancing parameters, at step S512 the VCU 10442 determines whether a confirmation signal has been received from the TSB 1046. The confirmation signal indicates that the TSB 1046 is prepared to apply the updated load-balancing parameters for load-balancing.

If the confirmation signal is not received from the TSB 1046, then at step S518 the VCU 10442 informs the network controller that the requested network configuration is not possible. The VCU 10442 may inform the network controller that the requested network configuration is not possible using any suitable network signaling. In at least one example, the VCU 10442 determines that a confirmation signal has not been received if the confirmation signal is not received with in a threshold time period (e.g., less than or equal to about 10 microseconds) after informing the TSB 1046 of the updated load-balancing parameters.

After informing the network controller that the requested network configuration is not possible, the process returns to step S502 and continues as discussed above.

Returning to step S512, if the confirmation signal is received from the TSB 1046, then at step S514 the VCU 10442 switches the TRAL 1044 to the updated routing configuration by changing the state of RIL 10440, and configuring the FTI 1042 and DDI 1048 accordingly. According to example embodiments, the changing the state of RIL 10440 includes changing the state of logic interconnection between the slot buffers SB1, SB2, . . . , SBm and the transceiver buffers TB1, TB2, . . . , TBm.

The TRAL 1044 configures the FTI 1042 by adapting or changing, at least logically, the interconnection between the AXI stream interface of P4 blocks and the AXI stream interfaces of the slot buffers SB1, SB2, . . . , SBm according to the updated routing configuration.

The TRAL 1044 configures the DDI 1048 by adapting or changing the interconnection logic to/from each transceiver TRX1, TRX21, TRX22, TRX3, . . . , TRXn1, TRXn2 on the FPGA 102 according to the updated routing configuration.

Also at step S514, if needed, the VCU 10442 sends a signal to the TSB 1046 to initiate switching of the TSB 1046 to the updated load-balancing parameters associated with the updated routing configuration.

At step S516, the VCU 10442 updates the state machine at the TRAL 1044 to store the current state (e.g., routing configuration state, load-balancing enabled, etc.). The process then returns to step S502 to perform another iteration upon determining that further updating of the routing configuration is required at the FPGA 102.

Although illustrated separately in FIG. 7, through steps S502 and S504 the VCU 10442 may be considered determining whether updating of the routing configuration is required at the FPGA 102.

Figure 8:
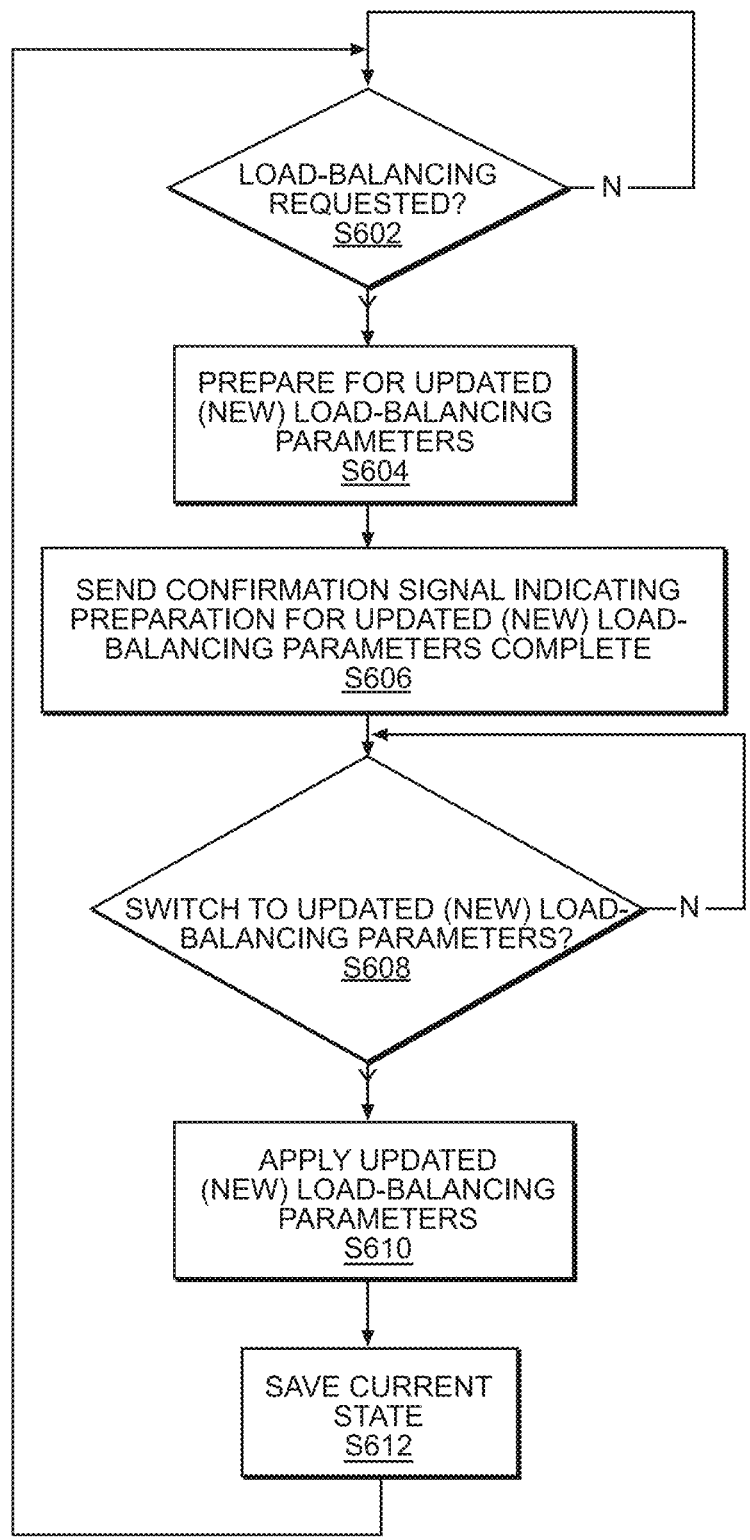
FIG. 8 is a flow chart illustrating another method according to example embodiments.

FIG. 8 is a flow chart illustrating a method according to example embodiments. The method shown in FIG. 8 will be discussed with regard to being performed by the TSB 1046 or elements thereof.

Referring to FIG. 8, while performing active (or current) load-balancing tasks at the TP 10464, according to any currently defined load-balancing parameters or rules, the TSB 1046 periodically checks whether an updated load-balancing demand has been received from the TRAL 1044 (via MD 10462). In at least one example embodiment, the updated load-balancing demand may be in the form of updated load-balancing parameters provided by the TRAL 1044 at step S510 in FIG. 7.

Once a load-balancing demand is received from the TRAL 1044, at step S604 the TSB 1046 prepares to switch to the new load-balancing parameters (or rules). According to one or more example embodiments, the TSB 1046 prepares to switch to the new load-balancing parameters by reading, via the MD 10462, the parameters that impact (e.g., directly impact) the load-balancing configuration. The parameters that are read by TSB 1046 may include, for example, a) the set of P4 blocks for load-balancing; b) the set of transceivers on which the load-balancing is performed; c) the weights (ratios) for load-balancing between sets of (P4 block, transceiver) pairs; etc. As discussed above with regard to FIGS. 7 and 10, these load-balancing parameters may be provided by the network controller or computed at the VCU 10442.

After having prepared to switch to the new load-balancing parameters, at step S606 the TSB 1046 (via the MD 10462) outputs the confirmation signal to the TRAL 1044 indicating that the TSB 1046 is prepared to switch to the new load-balancing parameters.

At step S608, the TSB 1046 determines whether to switch to the updated load-balancing parameters based on signaling from the TRAL 1044 (e.g., whether the signal to initiate switching of the TSB 1046 to the updated load-balancing parameters has been received from the TRAL 1044).

If the signal to initiate switching of the TSB 1046 to the updated load-balancing parameters has not been received from the TRAL 1044, then the TSB 1046 does not switch to the updated load-balancing parameters. In this case, the process returns to step S608 and the TSB 1046 continues to wait until receiving the signal initiating the switching form the TRAL 1044.

If the TSB 1046 has received the signal to initiate switching of the TSB 1046 to the updated load-balancing parameters at step S608, then at step S610 the TSB 1046 applies (or begins to apply) the updated load-balancing parameters for load-balancing traffic flows transmitted and received through the transceivers at the FPGA 102.

At step S612, the TSB 1046 updates a state machine (not shown) to store the current state (e.g., load-balancing parameter state). The process then returns to step S602 to perform another iteration in response to a request for load-balancing.

General key "use-cases" supported by one or more example embodiments will now be described with regard to FIGS. 3-6.

FIGS. 3-6 illustrate example use cases of FPGAs according to example embodiments.

Figure 3:
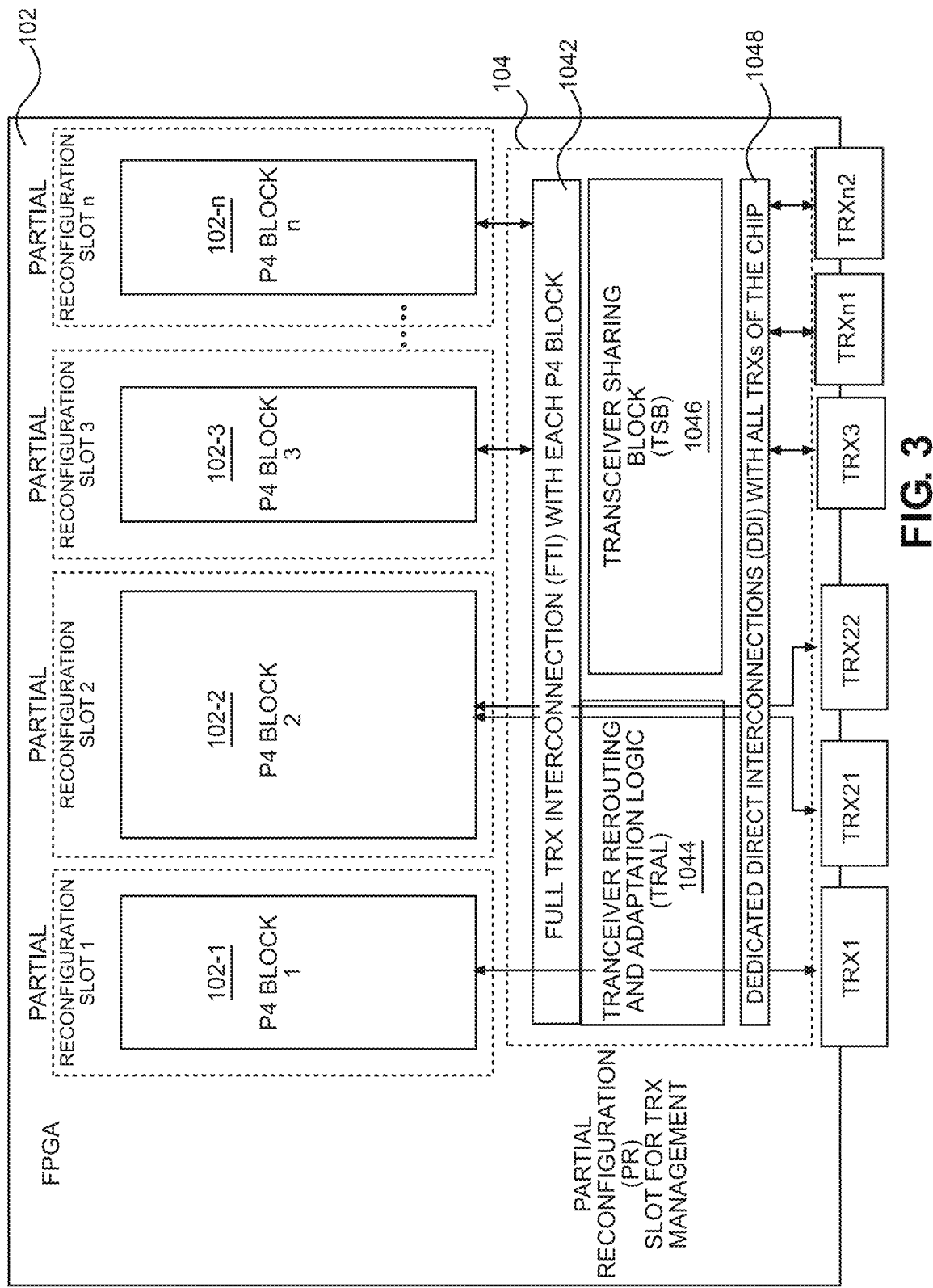
FIG. 3 illustrates an example use case of FPGAs according to example embodiments.

FIG. 3 illustrates a first use case, which does not involve load-balancing (Use-case 1: fixed routing, no transceiver sharing).

Referring to FIG. 3, transceiver TRX1 is allocated to P4 block 102-1 and transceivers TRX21 and TRX22 are allocated to P4 block 102-2. Remaining transceivers TRX3, . . . , TRXn1 and TRXn2 are allocated to the remaining P4 blocks 102-3, . . . , 102-n.

In the example shown in FIG. 3, P4 blocks 102-1 and 102-2 are active and transceivers TRX1, TRX21 and TRX22 allocated to these P4 blocks are also active. The transceivers TRX3, . . . , TRXn1 and TRXn2 of currently unused P4 blocks 102-3, . . . , 102-n are not active and also not shared.

In this case, the traffic flows between the P4 blocks 102-1 and 102-1 and transceivers TRX1, TRX21 and TRX22 is routed through the FTI 1042, the TRAL 1044 and the DDI 1048, but without the utilization of the TSB 1046.

Figure 4:
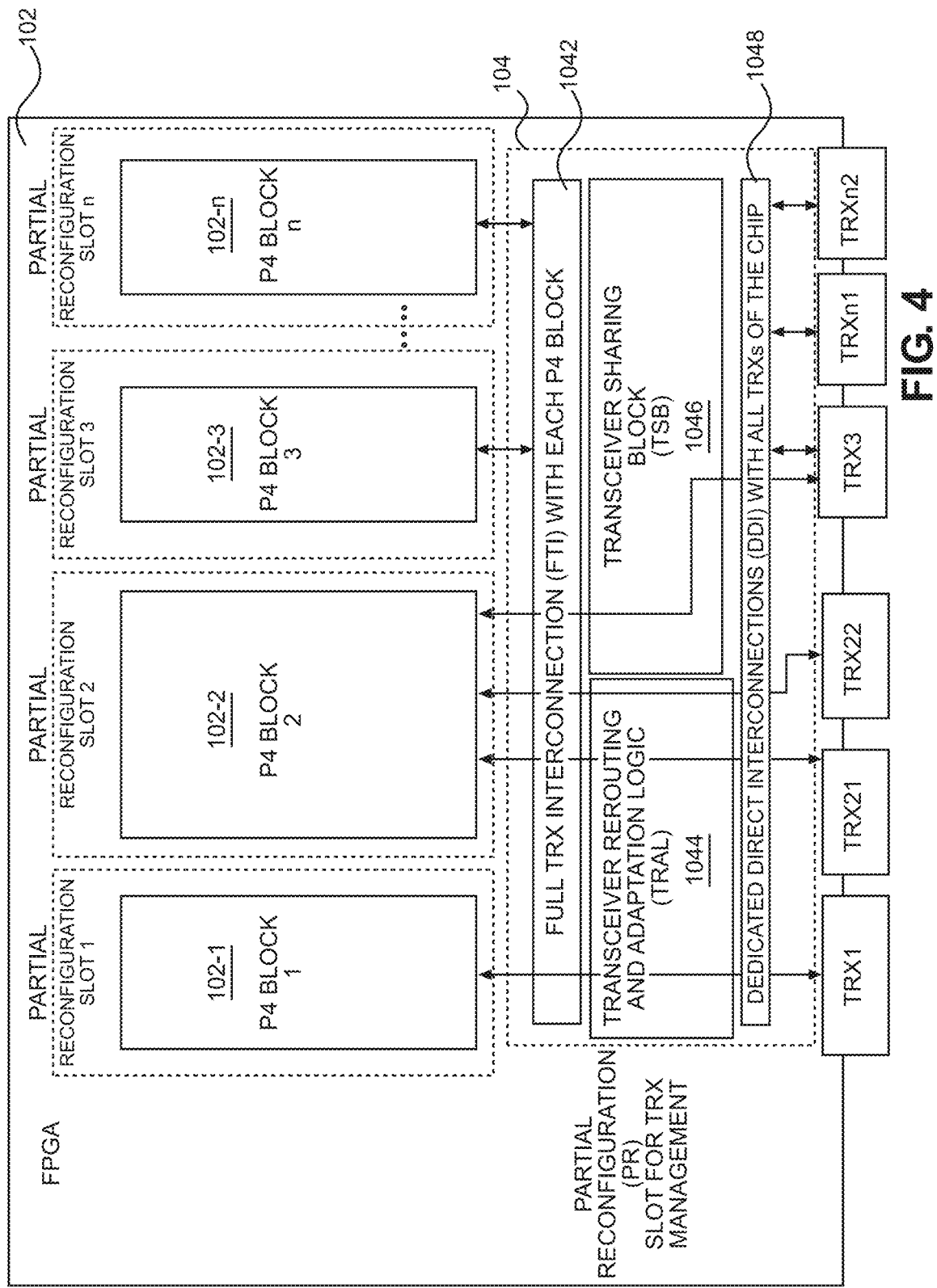
FIG. 4 illustrates another example use case of FPGAs according to example embodiments.

FIG. 4 illustrates a second use case, which does not involve load-balancing, but does involve transceiver sharing (Use-case 2: fixed routing, transceiver sharing).

The example embodiment shown in FIG. 4 is similar to the example embodiment shown in FIG. 3 in that P4 blocks 102-1 and 102-2 are active and transceivers TRX1, TRX21 and TRX22 allocated to the P4 blocks are also active. In contrast to the example embodiment shown in FIG. 3, however, transceiver TRX3 of unused P4 block 102-3 is also active and temporarily allocated (or "shared") for use by an active P4 block (P4 block 102-2 in this example).

In this case, the traffic flows between the P4 blocks 102-1 and 102-2 and transceivers TRX1, TRX21, TRX22 and TRX3 is routed through the FTI 1042, the TRAL 1044 and the DDI 1048, but again without the utilization of the TSB 1046.

Figure 5:
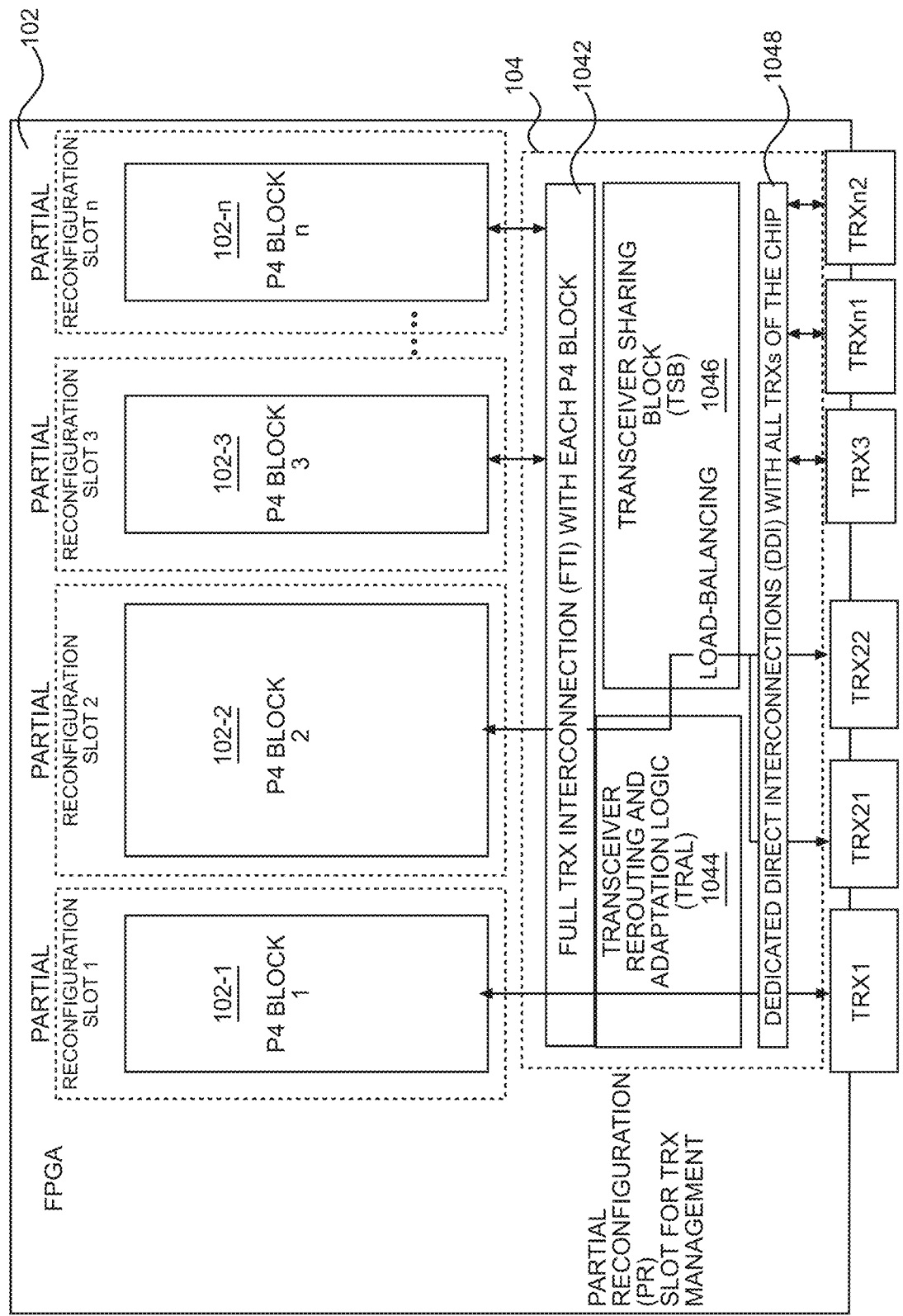
FIG. 5 illustrates yet another example use case of FPGAs according to example embodiments.

FIG. 5 illustrates a third use case, which does not involve sharing, but does include load-balancing (Use-case 3: "dynamic routing, no transceiver sharing).

Referring to FIG. 5, transceiver TRX1 is allocated to P4 block 102-1 and transceivers TRX21 and TRX22 are allocated to P4 block 102-2. Remaining transceivers TRX3, . . . , TRXn1 and TRXn2 are allocated to the remaining P4 blocks 102-3, . . . , 102-n.

Similar to the example embodiment shown in FIG. 3, in FIG. 5 P4 blocks 102-1 and 102-2 are active and transceivers TRX1, TRX21 and TRX22 allocated to these P4 blocks are also active. The transceivers TRX3, . . . , TRXn1 and TRXn2 of unused P4 blocks 102-3, ..., 102-n are not active and also not shared. Unlike the example embodiment shown in FIG. 3, the example embodiment shown in FIG. 5 also includes load-balancing by the TSB 1046.

The load-balancing allows for traffic from some P4 blocks to be automatically load-balanced between allocated transceivers by the TSB 1046 as needed (e.g., if required).

In the example embodiment shown in FIG. 5, traffic from P4 block 102-2 is automatically load-balanced between allocated transceivers TRX21 and TRX22 by the TSB 1046. Thus, in this example, the traffic between P4 block 102-1 and transceiver TRX1 is routed through the FTI 1042, the TRAL 1044 and the DDI 1048, and the traffic between P4 block 102-2 and transceivers TRX21 and TRX22 is routed through the FTI 1042, the TRAL 1044, the TSB 1046 (for load-balancing) and the DDI 1048.

Figure 6:
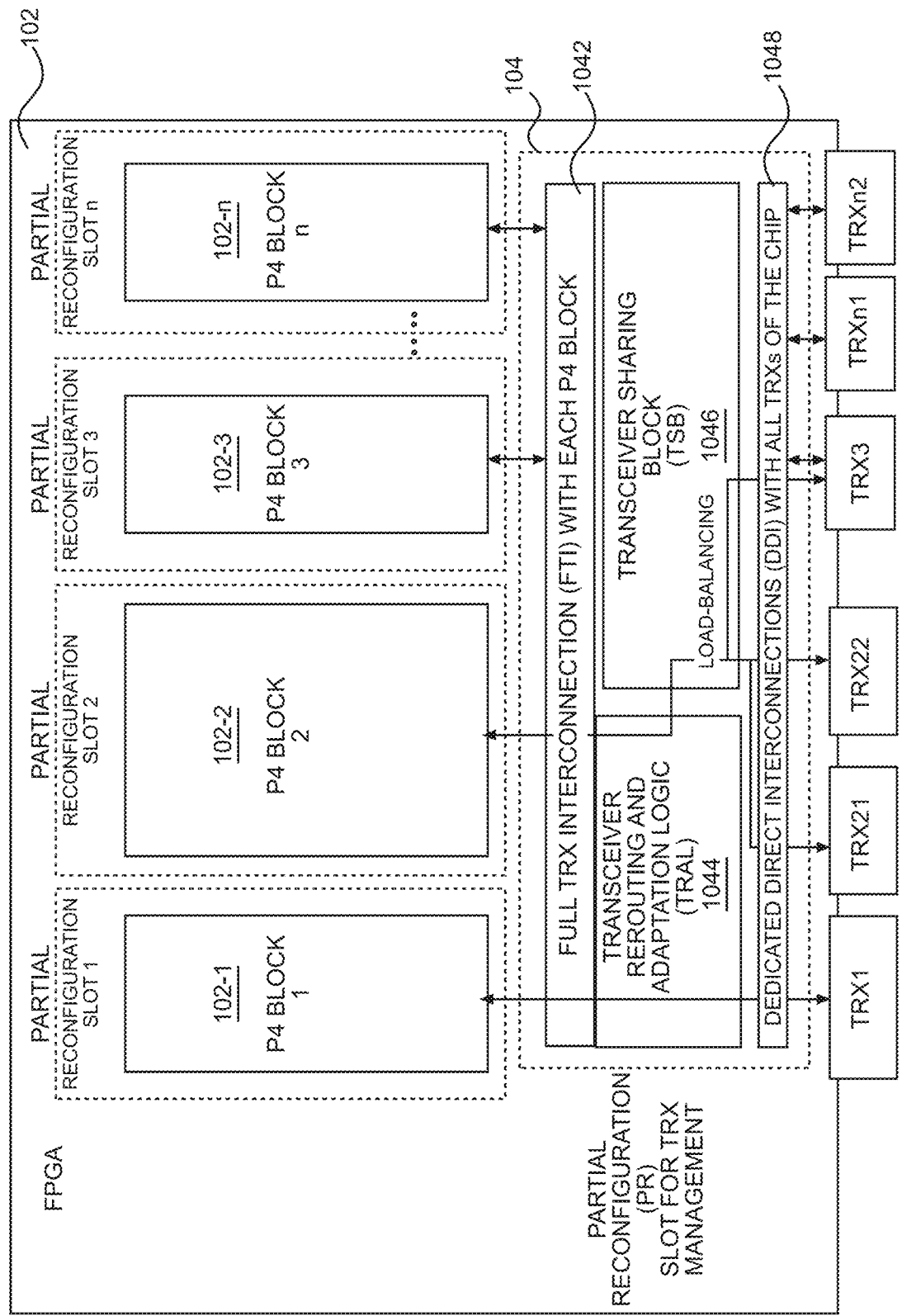
FIG. 6 illustrates yet another example use case of FPGAs according to example embodiments.

FIG. 6 illustrates a fourth use case, which involves load-balancing and transceiver sharing (Use-case 4: dynamic routing, transceiver sharing).

The example embodiment shown in FIG. 6 is similar to the example embodiment shown in FIG. 5 in that P4 blocks 102-1 and 102-2 are active and transceivers TRX1, TRX21 and TRX22 allocated to these P4 blocks are also active. In contrast to the example embodiment shown in FIG. 5, however, transceiver TRX3 of unused P4 block 102-3 is also active and temporarily allocated (or "shared") for use by an active P4 block (P4 block 102-2 in this example).

In the example embodiment shown in FIG. 6, traffic from P4 block 102-2 is automatically load-balanced between allocated transceivers TRX21, TRX22 and TRX3 by the TSB 1046. Thus, in this example, the traffic between P4 block 102-1 and transceiver TRX1 is routed through the FTI 1042, the TRAL 1044 and the DDI 1048, and traffic between P4 block 102-2 and transceivers TRX21, TRX22 and TRX3 is routed through the FTI 1042, the TRAL 1044, the TSB 1046 (for load-balancing) and the DDI 1048.

One or more example embodiments enable FPGA transceiver virtualization. Such virtualization may enable cost savings of transceiver capacity on programmable devices, such as FPGAs (e.g., by offering sharing/reuse of transceiver capacity) and/or improve performance (e.g., by offering load-balancing of tasks between different transceivers on FPGAs).

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing network apparatuses, elements or entities including cloud-based data centers, computers, cloud-based servers, or the like. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network apparatus, network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, network apparatuses, elements or entities including cloud-based data centers, computers, cloud-based servers, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

Reference is made in detail to embodiments, examples of which are illustrated in the accompanying drawings, wherein like reference numerals refer to the like elements throughout. In this regard, the example embodiments may have different forms and should not be construed as being limited to the descriptions set forth herein. Accordingly, the example embodiments are merely described below, by referring to the figures, to explain example embodiments of the present description. Aspects of various embodiments are specified in the claims.

What is claimed is:

1. A programmable device comprising:
   a plurality of first partial reconfiguration slots configured to execute one or more applications or network functions;
   a plurality of programming blocks configured to execute an application or network function, each of the plurality of first partial reconfiguration slots including a programming block of the plurality of programming blocks;
   a plurality of transceivers; and
   a second partial reconfiguration slot configured to
      compute a routing configuration for routing data traffic flows between the plurality of first partial reconfiguration slots and the plurality of transceivers based on a request from a network controller, the request including load-balancing parameters for the routing configuration,
      route the data traffic flows between the plurality of first partial reconfiguration slots and the transceivers based on the routing configuration,
      sort the plurality of transceivers in order based on bandwidth capacities for each of the plurality of transceivers,
      sort the plurality of programming blocks based on bandwidth requirements for the plurality of programming blocks, and
      compute updated load-balancing parameters based on the sorted plurality of transceivers and the sorted plurality of programming blocks.

2. The programmable device of claim 1, wherein the second partial reconfiguration slot is configured to
   determine that at least a portion of a first partial reconfiguration slot, among the plurality of first partial reconfiguration slots, is to become active or inactive,
   determine that a change to a current routing configuration is required in response to determining that at least the portion of the first partial reconfiguration slot is to become active or inactive, and
   compute the routing configuration in response to determining that a change to the current routing configuration is required.

3. The programmable device of claim 1, wherein
   the second partial reconfiguration slot is configured to
      determine that load-balancing of the data traffic flows is required at the programmable device based on the request,
      apply the load-balancing, according to the load-balancing parameters, to route the data traffic flows between the plurality of first partial reconfiguration slots and the plurality of transceivers.

4. The programmable device of claim 1, wherein the load-balancing parameters include
an identification of transceivers, from among the plurality of transceivers, to be utilized for load-balancing of the data traffic flows at the programmable device, and
a ratio of the data traffic flows to be transmitted between sets of transceiver and partial reconfiguration slot pairs.

5. The programmable device of claim 1, wherein the second partial reconfiguration slot comprises:
full interconnection with each of the plurality of first partial reconfiguration slots, and
dedicated direct interconnections with each of the plurality of transceivers.

6. The programmable device of claim 5, wherein the second partial reconfiguration slot comprises:
interconnection circuitry interconnected with each of the plurality of first partial reconfiguration slots;
dedicated direct interconnection circuitry interconnected with each of the plurality of transceivers; and
a transceiver rerouting and adaptation logic configured to route the data traffic flows between the interconnection circuitry and the dedicated direct interconnection circuitry.

7. The programmable device of claim 6, wherein the second partial reconfiguration slot comprises:
transceiver sharing circuitry configured to apply load-balancing to route the data traffic flows.

8. The programmable device of claim 1, wherein the programmable device is a field-programmable gate array (FPGA).

9. A method of routing traffic at a programmable device including a plurality of first partial reconfiguration slots, a plurality of programming blocks, a plurality of transceivers, and a second partial reconfiguration slot, wherein each of the plurality of first partial reconfiguration slots includes a programming block of the plurality of programming blocks, the method comprising:
configuring the second partial reconfiguration slot to route data traffic flows between the plurality of first partial reconfiguration slots and the plurality of transceivers at the programmable device, the plurality of first partial reconfiguration slots configured to execute one or more applications or network functions;
routing the data traffic flows between the plurality of first partial reconfiguration slots and the plurality of transceivers;
computing a routing configuration for routing the data traffic flows between the plurality of first partial reconfiguration slots and the plurality of transceivers based on a request from a network controller, the request including load-balancing parameters for the routing configuration;
configuring the second partial reconfiguration slot based on the routing configuration;
sorting the plurality of transceivers in order based on bandwidth capacities for each of the plurality of transceivers;
sorting the plurality of programming blocks based on bandwidth requirements for the plurality of first partial reconfiguration slots; and
computing updated load-balancing parameters based on the sorted plurality of transceivers and the sorted plurality of programming blocks.

10. The method of claim 9, further comprising:
determining that at least a portion of a first partial reconfiguration slot, among the plurality of first partial reconfiguration slots, is to become active or inactive;
determining that a change to a current routing configuration is required in response to determining that at least the portion of the first partial reconfiguration slot is to become active or inactive; and
computing the routing configuration in response to determining that a change to the current routing configuration is required.

11. The method of claim 9, wherein
the method further includes
determining that load-balancing of the data traffic flows is required at the programmable device based on the request, and
applying the load-balancing, according to the load-balancing parameters, to route the data traffic flows between the plurality of first partial reconfiguration slots and the plurality of transceivers.

12. The method of claim 9, wherein the load-balancing parameters include
an identification of transceivers, from among the plurality of transceivers, to be utilized for load-balancing of the data traffic flows at the programmable device, and
a ratio of the data traffic flows to be transmitted between sets of transceiver and first partial reconfiguration slot pairs.

13. The method of claim 9, wherein the programmable device is a field-programmable gate array (FPGA).

14. A non-transitory computer-readable storage medium storing computer-readable instructions that, when executed at a programmable device, cause the programmable device to perform a method of routing traffic at the programmable device, the programmable device including a plurality of first partial reconfiguration slots, a plurality of programming blocks, a plurality of transceivers, and a second partial reconfiguration slot, wherein each of the plurality of first partial reconfiguration slots includes a programming block of the plurality of programming blocks, and the method comprising:
configuring the second partial reconfiguration slot to route data traffic flows between the plurality of first partial reconfiguration slots and the plurality of transceivers at the programmable device, the plurality of first partial reconfiguration slots configured to execute one or more applications or network functions; and
routing the data traffic flows between the plurality of first partial reconfiguration slots and the plurality of transceivers
computing a routing configuration for routing the data traffic flows between the plurality of first partial reconfiguration slots and the plurality of transceivers based on a request from a network controller, the request including load-balancing parameters for the routing configuration;
configuring the second partial reconfiguration slot based on the routing configuration;
sorting the plurality of transceivers in order based on bandwidth capacities for each of the plurality of transceivers;
sorting the plurality of programming blocks based on bandwidth requirements for the plurality of first partial reconfiguration slots; and
computing updated load-balancing parameters based on the sorted plurality of transceivers and the sorted plurality of programming blocks.

15. The non-transitory computer-readable storage medium of claim 14, wherein the method further comprises:

determining that at least a portion of a first partial reconfiguration slot, among the plurality of first partial reconfiguration slots, is to become active or inactive;

determining that a change to a current routing configuration is required in response to determining that at least the portion of the first partial reconfiguration slot is to become active or inactive; and computing the routing configuration in response to determining that a change to the current routing configuration is required.

16. The non-transitory computer-readable storage medium of claim 14, wherein the method further includes determining that load-balancing of the data traffic flows is required at the programmable device based on the request, and applying the load-balancing, according to the load-balancing parameters, to route the data traffic flows between the plurality of first partial reconfiguration slots and the plurality of transceivers.

* * * * *